Aug. 5, 1952  J. D. HOOD  2,605,899
RECORD CONTROLLED MACHINE
Filed July 3, 1947  8 Sheets-Sheet 7

CARD FEED STARTS

INVENTOR
JAMES D. HOOD
BY
ATTORNEY

FIG. 4.

Patented Aug. 5, 1952

2,605,899

UNITED STATES PATENT OFFICE 2,605,899

RECORD CONTROLLED MACHINE

James D. Hood, Owego, N. Y., assignor to International Business Machines Corporation, New York, N. Y., a corporation of New York Application July 3, 1947, Serial No. 758,732

12 Claims. (Cl. 209—110)

This invention relates to record controlled machines and more particularly to that type of machine which has become known in the art as a collator, a representative commercial form of which is disclosed in Patent No. 2,379,828.

In this type of machine, provisions are made for feeding perforated record cards and comparing them and distributing them in accordance with comparisons made of certain data which ordinarily is recorded in the cards by means of perforations. The machine disclosed in this patent compares the records and distributes them in various ways in accordance with numbers recorded in the records by means of perforations and the records themselves consist of a very commonly used form of record card.

The primary object of the present invention is to provide an improved comparing mechanism for a machine of the above type which is capable of comparing records alphabetically as well as numerically.

Another object is to provide a comparing mechanism which enables records to be compared alphabetically without resorting to the expedient of using two columns on the record card for each character recorded.

An object is to provide a comparing mechanism which requires only a very simple alteration in the structure of the machine shown in the above patent to enable records to be compared alphabetically.

An object is to provide a record comparing mechanism which enables records to be compared alphabetically without resorting to the expedient of sacrificing record capacity when the alphabetic data is recorded in the records.

It has been commercial practice in the past to record alphabetic data by combinations of two perforations placed in the twelve index-point positions of a conventional Hollerith-type record card. This type of record card is divided into a certain number of vertical columns, usually 45 or 80, each containing twelve index-point positions and each letter of the alphabet is designated in each column by a perforation in the 0, 11, or 12 positions, commonly called the zone perforations or positions and a perforation in one of the 1 to 9 index-point positions, called the numerical holes or positions.

The usual code by means of which alphabetical data is recorded is given below:

Table I.—The Alphabetical Code

A—12, 1
B—12, 2
C—12, 3
D—12, 4
E—12, 5
F—12, 6
G—12, 7
H—12, 8
I—12, 9
J—11, 1
K—11, 2
L—11, 3
M—11, 4
N—11, 5
O—11, 6
P—11, 7
Q—11, 8
R—11, 9
S—0, 2
T—0, 3
U—0, 4
V—0, 5
W—0, 6
X—0, 7
Y—0, 8
Z—0, 9

In order to compare the numerical data, it is customary to provide electrical sensing brushes which traverse each record column and these brushes, by reaching through the numerical perforations placed in the 1 to 9 positions, close circuits which, in the above patent, set up various comparing circuits, enabling a comparison to be made of the numerical data on two records.

In order to compare alphabetical data by means of the machine disclosed in the above patent it has been the practice to use two columns on the record card for recording each character of the alphabetical data, placing the zone holes in one of these columns and the numerical holes in the others. Thus alternate columns are devoted to reception of zone holes and numerical holes, respectively. By this expedient it is possible to use the machine of the above patent to compare alphabetical data as if it were numerical data. In order to effect this result the 0, 11, 12 zone holes are connected into equivalents in numerical index-point positions and the brushes for the columns containing the zone holes are plugged to alternate orders or positions of the comparing mechanisms so that the value of the numerical portion of the code for any character is entered into one position of the comparing unit and the connected value of the associated zone hole is entered into the next higher order of the comparing unit. Thus a 12 hole might be recorded as a 6, for example; an 11 hole as a 7; and a 0 hole as an 8, the particular group of holes selected not being important so long as they occur in the same order in the 1 to 9 positions, and have the same relative sequence meaning, as the zone holes ordinarily appear in the 0, 11, and 12 positions of the conventional alphabetical card. The following table shows how this may be done:

Table II

A—6, 1
B—6, 2
C—6, 3
D—6, 4
E—6, 5
F—6, 6

Table II—Continued

| | |
|---|---|
| G—6, 7 | Q—7, 8 |
| H—6, 8 | R—7, 9 |
| I—6, 9 | S—8, 2 |
| J—7, 1 | T—8, 3 |
| K—7, 2 | U—8, 4 |
| L—7, 3 | V—8, 5 |
| M—7, 4 | W—8, 6 |
| N—7, 5 | X—8, 7 |
| O—7, 6 | Y—8, 8 |
| P—7, 7 | Z—8, 9 |

This expedient, while it enables alphabetical cards to be compared, is very undesirable for the reason that it greatly reduces the capacity of the commercial record card which is insufficient, as it is, under many conditions, to record all of the data that it may be desired to record in one card and the trend has been toward increasing the capacity of the card merely to increase its capability for receiving a greater amount of numerical data. The main reason why the capacity of the card is greatly reduced is because the recording of names alone requires a very large field on the card, sometimes as many as twenty or thirty columns may be required to provide sufficient capacity to take care of most common long names and the differentiating initials. When it is borne in mind that this must be doubled in the card to provide the additional columns for recording the translated zone holes it will be appreciated that even an 80-column card will have very little capacity left for recording numerical data. Often when the cards are punched alphabetically by the more conventional way of using only one column for each possible character, as in Table I, there still is insufficient capacity in a great many cases.

It, therefore, is the object of the present invention to provide a comparing mechanism which obviates the use of double columns and thereby enables the capacity of the card to be used to the maximum possible extent.

Other objects of the invention will be pointed out in the following description and claims and illustrated in the accompanying drawings, which disclose, by way of example, the principle of the invention and the best mode, which has been contemplated, of applying that principle.

It will be noted by reference to Table I that the alphabet is divided into three major sequence groups differentiated by the zone holes 12, 11, and 0, of which the group A to I, involving combinations of the 1 to 9 holes with the 12 hole is first in sequence and the group S to Z, involving the 0 hole and the 2 to 9 holes, is last in sequence.

The usual order of sensing of the index-point positions on the card begins with the 9 position and traverses the card to the 0 position then traverses the zone index-point positions in the order 0, 11, and 12, the sensing of the zone positions being inverse to the numerical significance of the holes in the 0 to 9 positions.

Since the zonal sequence or zonal grouping of the character agrees in respect to the traversing of the record column by a sensing brush to the sequence within the group as determined by the 1 to 9 positions, it is possible to recode the alphabet in the manner disclosed in Table II in which the 0, 11, and 12 holes have been given the arbitrary values 8, 7, and 6, respectively. Thus the letter A might be considered as equivalent to a 6 hole and a 1 hole, the letter J as a 7 hole and the 1 hole, and S an 8 hole and a 2-hole. In other words, it is possible to consider these three letters as the numbers 61, 71, and 82, respectively for purposes of comparison by entering these letters in the comparing units by making use of two denominations of the comparing unit.

Figure 1A:
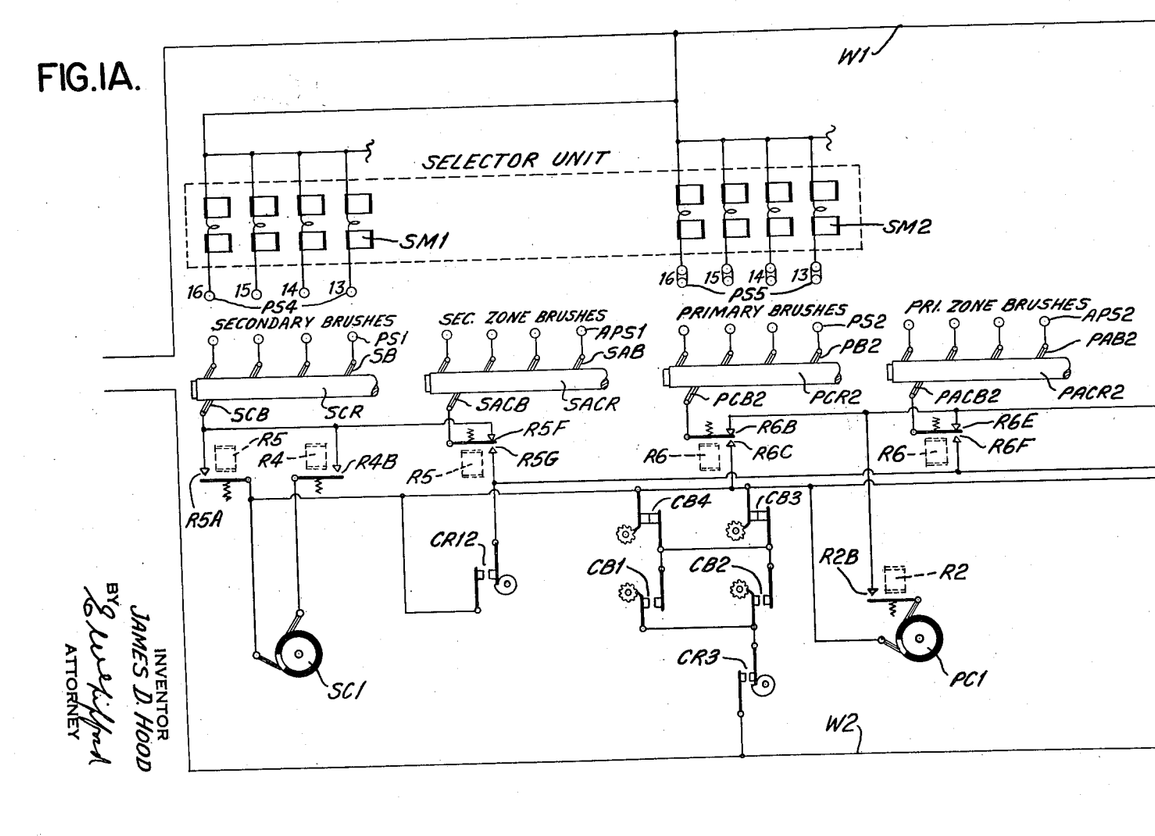
Figs. 1A to 1E together comprise a wiring diagram of the machine.
Figure 1B:
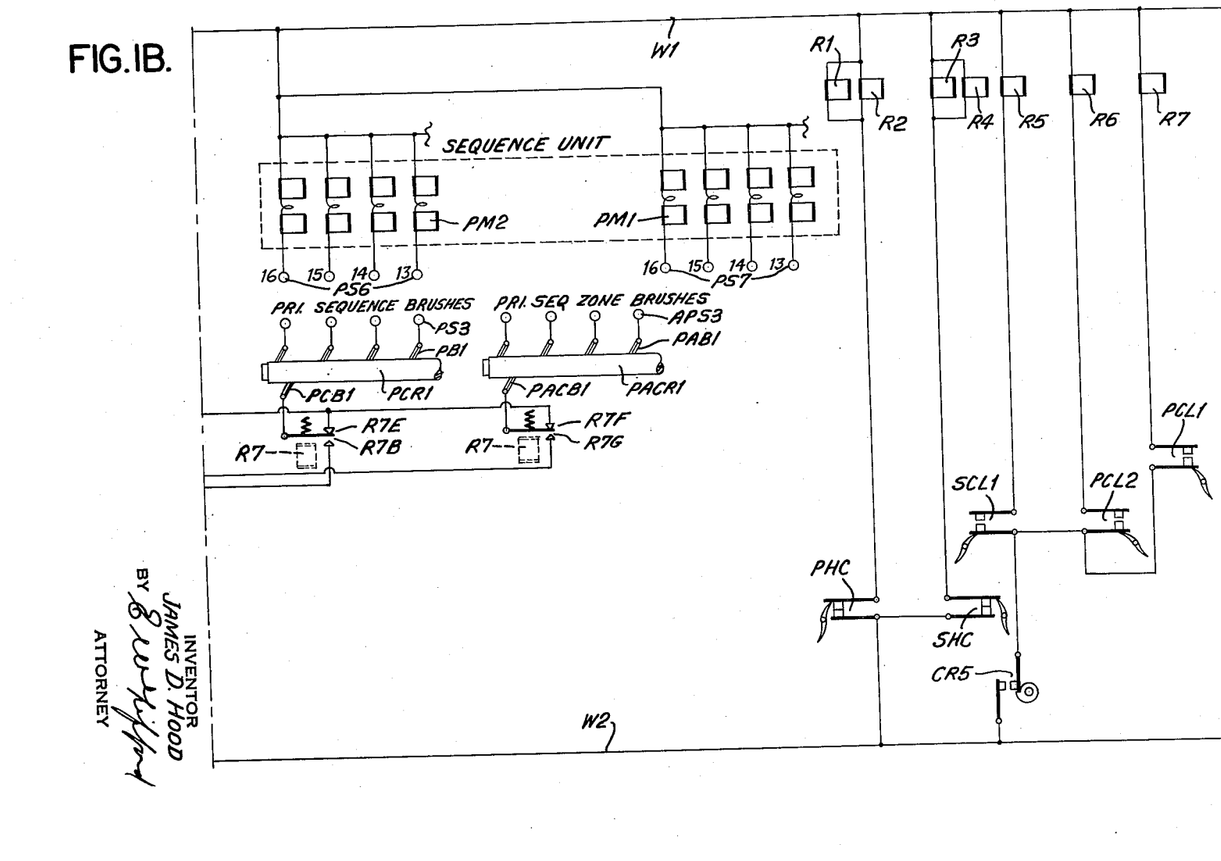
Figure 1C:
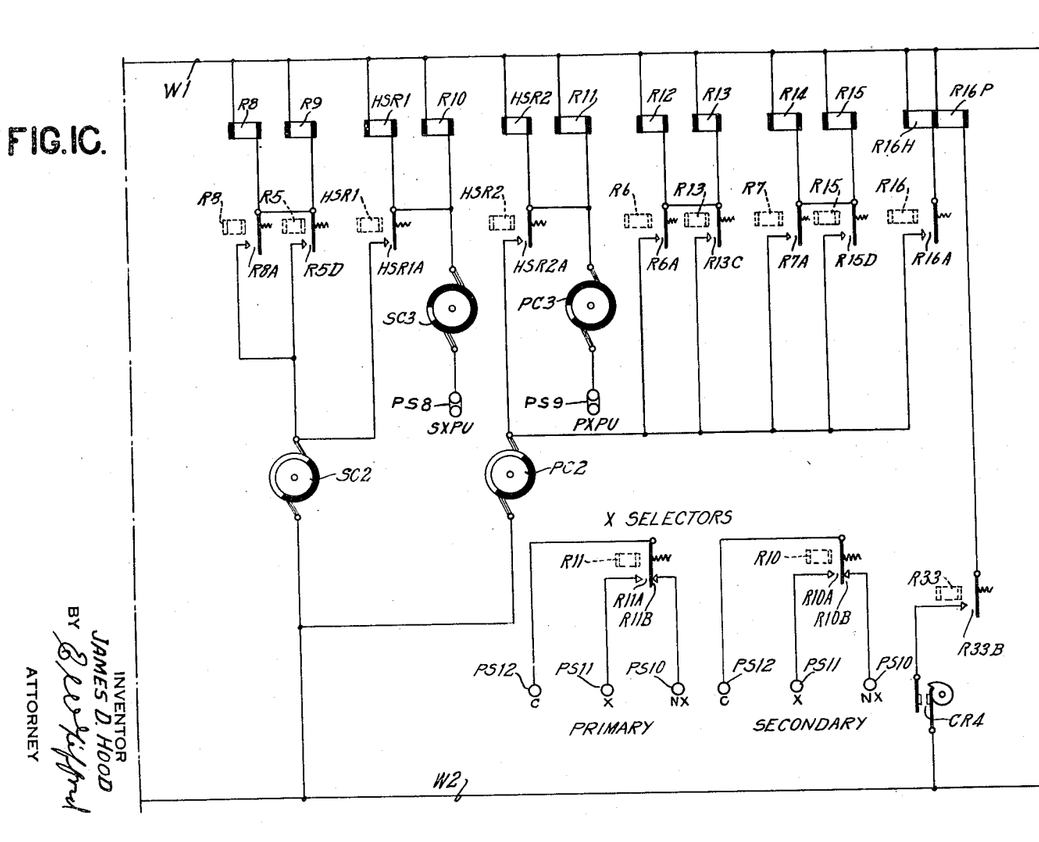
Figure 1D:
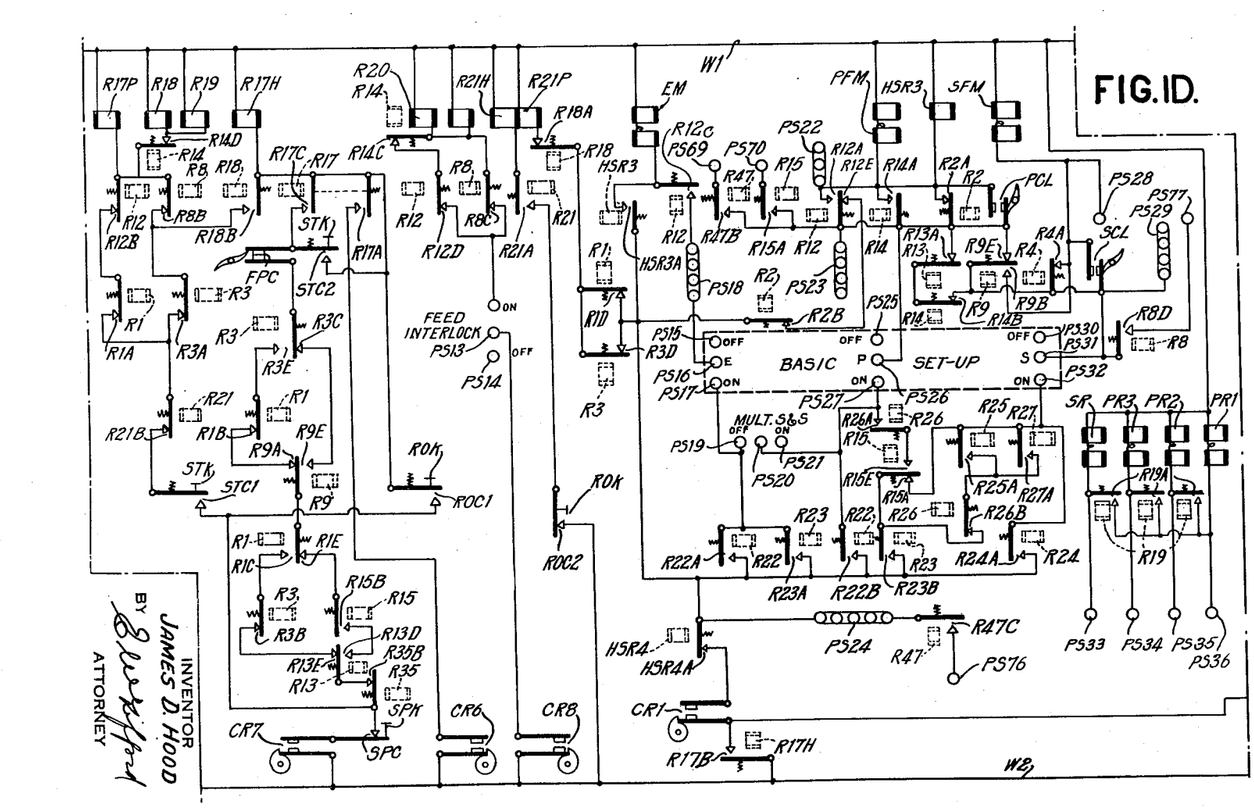
Figure 1E:
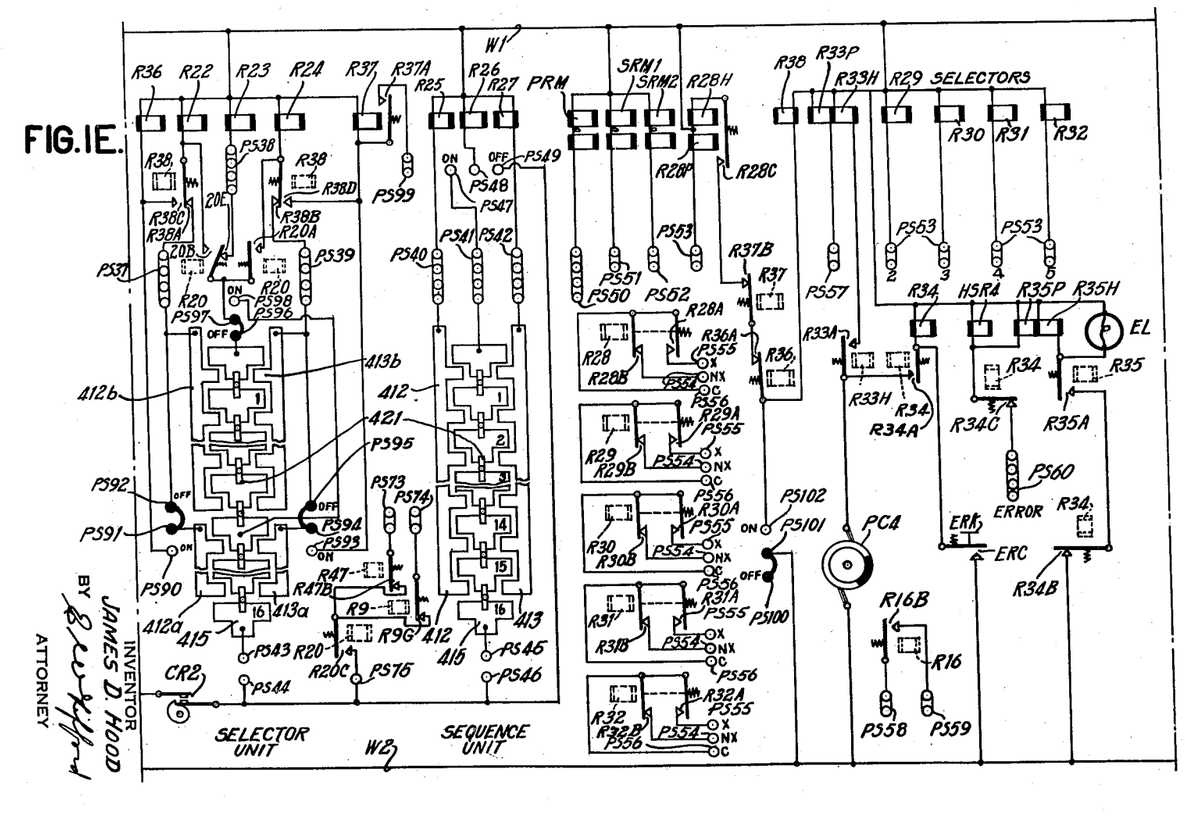
Figure 2:
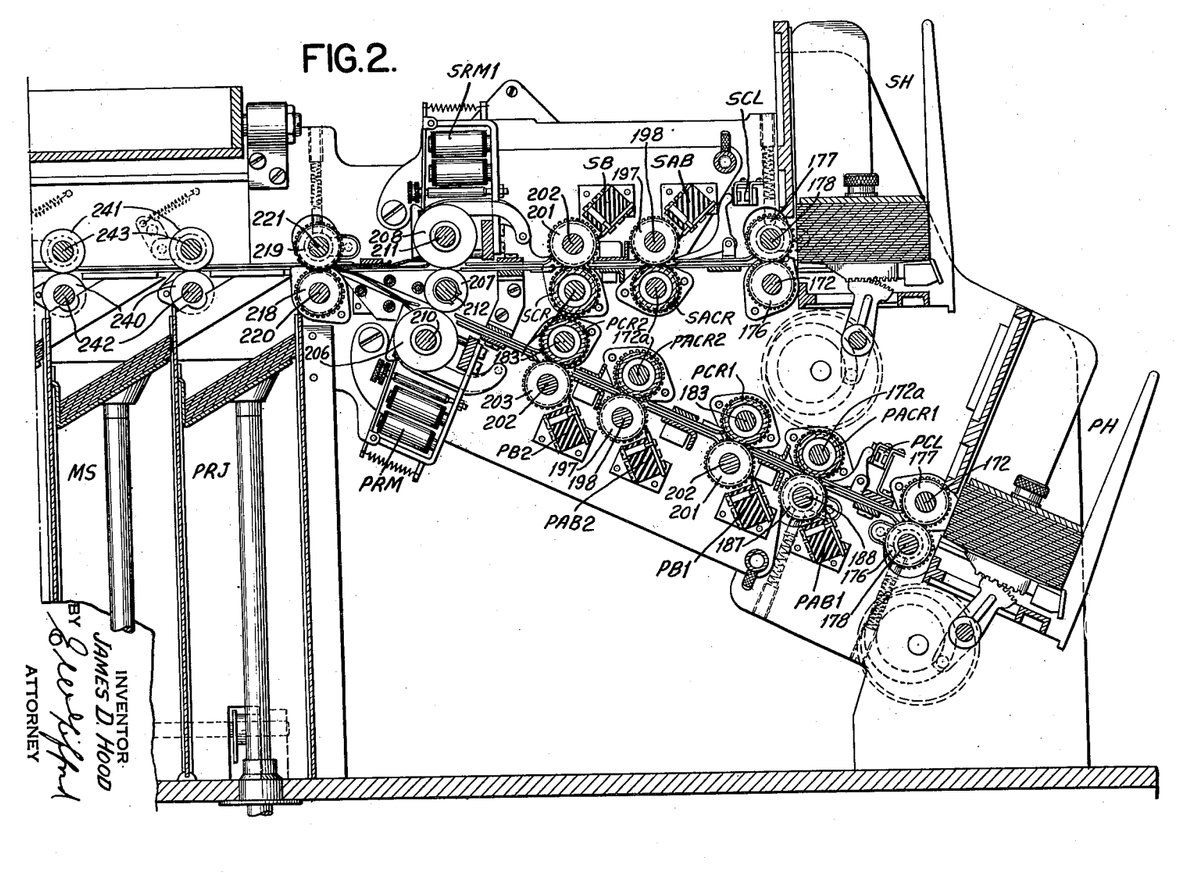
Fig. 2 is a vertical section through the right hand portion of the machine containing the primary and secondary feeding mechanisms and the record distributing mechanism.
Figure 3A:
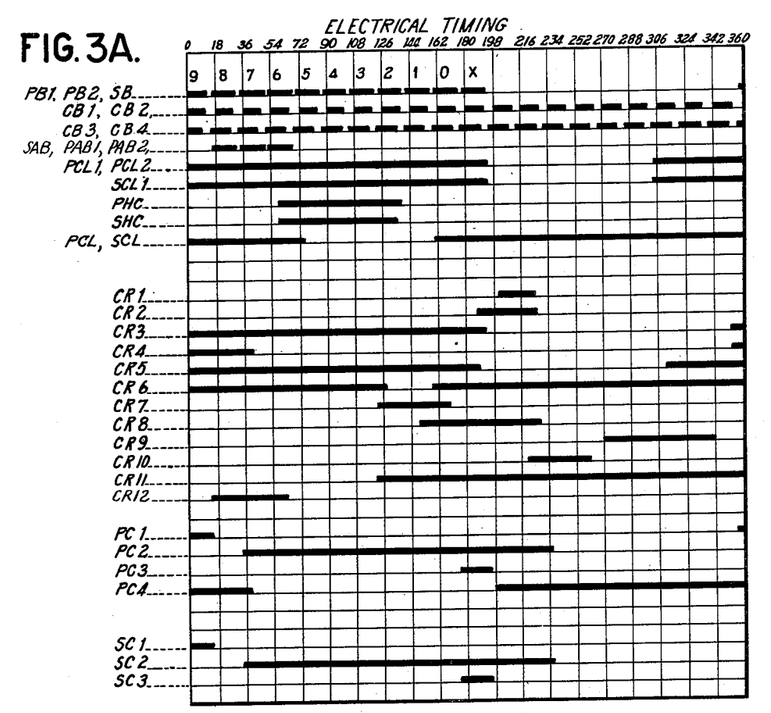
Figs. 3A and 3B together comprise a timing chart showing the electrical and mechanical timing of the machine respectively.
Figure 3B:
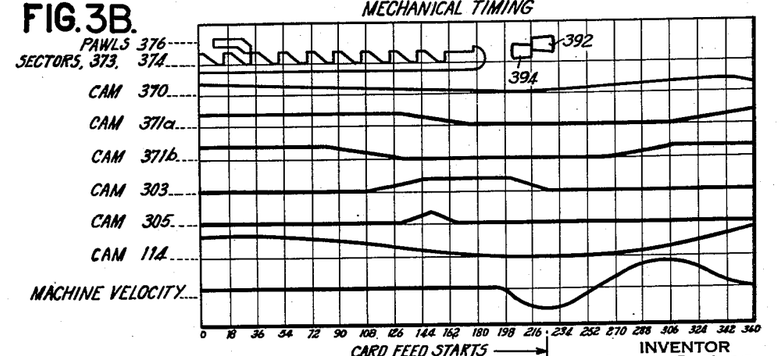

In order to make use of this principle, the machine disclosed in the above patent is provided with three sets of auxiliary sensing brushes which are designated SAB, PAB1, and PAB2 in Figs. 1A, 1B, and 2 of the drawings and identified as the secondary alphabetic brushes, the first primary alphabetic brushes, and the second primary alphabetic brushes, respectively. These brushes are associated with the brushes SB, PB1, and PB2, respectively, which are retained in the machine as in the above patent and are similarly designated in Figs. 1A, 1B, and 2. These brushes are structurally identical with the brushes SB, PB1, and PB2 but are located, with their companion contact rolls SACR, PACR1, and PACR2, approximately in the relative positions occupied by the feed rollers 184, 197 of the above patent whereby, for example, the secondary alphabetic brushes SAB sense the 0, 11, and 12 index-point positions at about the time the main secondary brushes SB are sensing the 8, 7, and 6 positions, respectively.

It is thus possible to electrically recode or translate the usual 12, 11, and 0 holes into 8, 7, and 6 impulses, respectively, and thereby enter their relative group sequence values in the comparing mechanism during the period in which the 1 to 9 positions are sensed. In other words, if a card is punched with a 12 hole, the 12 hole will be sensed by a main brush SAB, for example, as if such hole were punched in the 6 position of the card column, and similarly at the other extreme a 0 hole will be treated as if it were an 8 hole and registered in an order or position of the comparing unit as an 8.

At the same time the zone holes are being sensed and entered in the various orders or positions of the comparing mechanism in this manner, the numerical holes will likewise be sensed and entered in other order of the comparing mechanism so that the net effect, for example, of sensing the 12, 1 hole combination designating A will be to enter such combination in two adjacent denominational orders of the comparing mechanism as the number 61. Thus a name like "Smith," for example, requiring five columns on the record card when the ordinary method of using two holes per column is used, would be translated by the auxiliary alphabetic brushes into the ten-digit number 82–74–69–83–68, requiring ten orders or positions of the comparing unit for its reception. The comparing unit will function exactly like it would for any other multidigit number and, in comparing the name "Smith" with another name similarly recoded by the effect of the brushes SAB, PAB1 and PAB2, the alphabetic data will be treated like a number with a large number of digits.

This, of course, reduces the capacity of the comparing mechanism by half, but in many cases, involving simple operations, it is possible to offset this by using both comparing units of the machine of the patent in series to provide sixteen columns capacity for alphabetic comparing; the comparing units of the commercial machine ordinarily comprising sixteen orders or positions. However, this loss of comparing capacity is a relatively minor evil in comparison with the necessity of using thirty-two columns of the record card under the former expedient of punching the zone holes in columns interspersed with the numerical columns since the capacity of the comparing mechanism may be made greater but it is not possible to increase the capacity of cards already punched.

Figure 4:
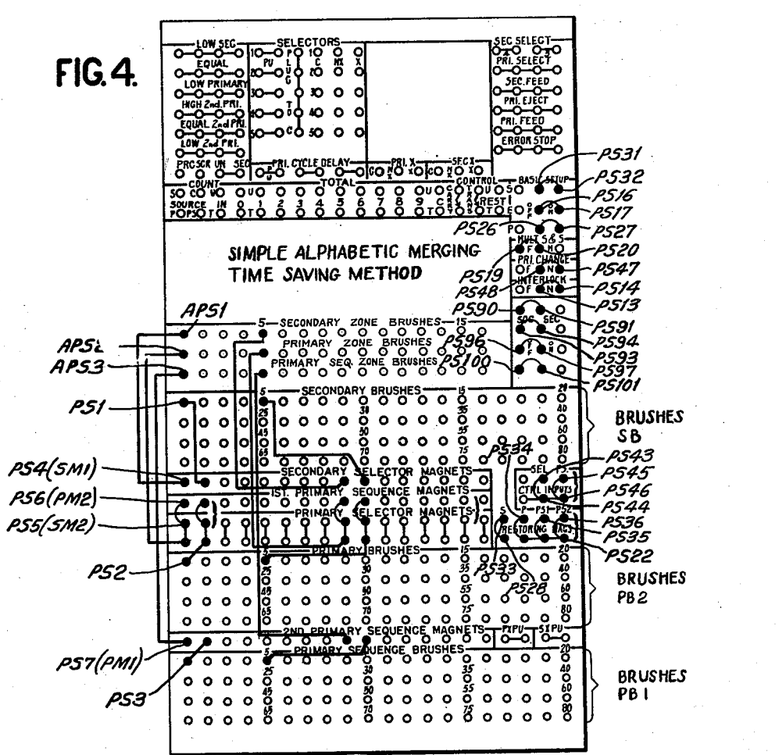
Fig. 4 consists of a plugboard chart showing how the machine is plugged for a simple operation in which the cards are to be merged in accordance with their alphabetic sequence.

Fig. 4 shows how the machine is plugged for a very simple merging operation equivalent to the one disclosed in Fig. 20d of the above patent involving an alphabetic field of five columns. The plug wires for the 2nd, 3rd, and 4th columns have been omitted to make it easier to see the method of plugging and avoid confusion of lines. Since the functioning of the machine in the present case under the alphabetic comparing control will be identical with the functioning of the machine in the above patent as described with reference to Fig. 20d therein, only the additional circuits involved in entering the alphabetic zone designation in the comparing unit and their effect will be described herein in detail.

It will be noted from Fig. 4 that the plug wires for the main brushes SB, PB1, and PB2 are plugged in the same manner as in the above patent but to alternate orders of the comparing units beginning with the fifteenth and terminating with the seventh, while the auxiliary or zone brushes SAB, PAB1, and PAB2 for columns 1 to 5 are plugged to positions 16, 14, 12, 10, and 8, respectively, it being necessary for any one card column to plug the orders of the comparing mechanism in such a manner that the zone holes for such column will be entered in as numbers the next higher order of the comparing unit to the one in which the numerical portion of the code for the same column is entered. Insofar as the numerical portion of the code is concerned, the machine will function exactly as in the above patent in comparing a single number, to enter the numerical portions in the fifteenth, thirteenth, eleventh, ninth, and seventh orders or positions of the comparing mechanism. The corresponding zone holes, however, will be entered in the sixteenth, fourteenth, twelfth, tenth, and eighth positions. Thus, if the name "Smith" in card columns 1 to 5 is to be compared with some other name, the designations for S, comprising a 2 hole in combination with a 0 hole, and translated by the column 1 brush SAB, for example, into an 8 hole, will be entered in the sixteenth and fifteenth orders of the comparing unit as if it were the number 82. The circuits for the numerical entry are set up in exactly the same fashion as in the above patent and a typical one through a brush SB may be traced in Fig. 1A as follows: Line wire W1, the fifteenth order comparing magnet SM1, the plug socket PS4, the plug wire, plug socket PS1, brush SB, the secondary contact roll SCR, common brush SCB, contacts R5A which are closed when the machine is running, the circuit breakers CB3, CB4, CB2, CB1, and contacts CR3, to line wire W2.

This causes the sector associated with the magnet SM1 to assume the numerical position 2 and a somewhat similar circuit is traced to the magnet SM1 for the sixteenth position through the secondary alphabetic brush SAB for the same column of the card as the brush SB mentioned above, the contact roll SACR, and brush SACB, relay contacts R5G, closed when the machine is running, contacts CR12 and thence through the circuit breakers CB1 to CB4 and contacts CR3, to the line wire W1. By these two circuits the letter S is entered in the comparing unit as 82 since, at the time the main brush SB is sensing the 8 index-point position, the brush SAB will be sensing the 0 position and the effect of the 0 hole will be translated into the comparing unit as at 8 but it will be in the next higher order to the 2 which is entered under control of the main brush SB.

It will be understood, of course, that the 82 will be entered in the secondary half of the selector unit. On the other side of the comparing unit there might be entered in a similar fashion some other alphabetic combination as, for example, 83 representing the letter T, Table II. If such were the case, the two columns compared under such conditions would cause the switching mechanism for the fifteenth order of the selector unit to become set to the low secondary condition, as in simple numerical comparison, thereby selecting the relay R22 or any function plugged to the plug socket PS37. With the plugging arrangement shown in Fig. 4 using the basic setup controls and involving only simple merging of records, it would signify that the secondary card designated "Smith" is lower in sequence than the card designated with the T with the result that the card designated "S" would be fed first, irrespective of the condition of the lower orders of the comparing unit because the sixteenth position or highest denominational order of the comparing unit will dominate in this case over the lower orders in the well known way and cause the card designated "S" to be fed first. The contacts CR12 time the auxiliary alphabetic brushes SAB, PAB1, and PAB2 to restrict the period in which they are operative to sense the card to the interval when the main brushes SB, PB1, and PB2 are sensing the 8, 7, and 6 positions on the cards. This prevents the even numbered orders of the comparing unit, which in the present case are devoted to receiving the translated zone representations, from responding to numerical designations at times in the cycle when the 9 to 1 positions are passing the auxiliary brushes. It is not necessary to similarly time the main brushes SB, PB1, PB2 because the energization of the numerical comparing magnets between 0, 11, and 12 in the cycle has no serious effect on the electromechanical comparing mechanism.

The comparing mechanisms function in exactly the same way as in the above patent when comparing simple numerical data, treating the alphabetic data entered therein exactly as if it were a large number. Thus "Smith" would be compared with "Snell" by recoding these names as 8274698368 and 8275657373 and treating them purely as numbers. In this case the 5 for Snell and the 4 for Smith in the thirteenth orders of the comparing unit will determine that the Snell card is higher in alphabetic sequence.

In the drawings the plugboard is shown as providing for only sixteen auxiliary brushes for columns 1 to 16 of the card making it necessary to record the alphabetic data in columns 1 to 16.

This is common practice in the art but it is apparent that the machine may be equipped with a greater number of auxiliary brushes or the brushes may be located in alignment with any desired columns without altering the principles of the invention.

The relays R4, R5, R6, R7 and contacts PC1, SC1 function on the run-out cycles to cause nines to be entered in the comparing units, exactly as in the patent, the extra relay contacts R5F, R5G, R6F, R6G, R7F, R7G serving the same purpose for brushes SAB, PAB1, PAB2 and the plugged orders of the comparing units as the contacts R6B, R6C, for example.

While there have been shown and described and pointed out the fundamental novel features of the invention, as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a machine controlled by records in which alphabetic data is recorded by combinations of two designations in each column of an alphabetic field, each character being designated by a pair of designations, one of which comprises a zonal designation representing one of a plurality of sequence groups into which the alphabet is divided and the other denotes the sequence within the group, comparing mechanism comprising two opposed sections, each section being divided into a series of pairs of comparing orders, one pair for each column of two record fields to be compared, said pairs of orders in each section being arranged in a denominational sequence coinciding with the columns of one of the fields; means for successively sensing the designations in said fields including a main successively sensing device for sensing the second-named designations in the two fields and connected to one of each of said pairs of orders and including separate auxiliary sensing means spaced from the first sensing means in the direction of successive sensing so as to sense the zonal designations while the main sensing device is sensing the other designations, said auxiliary sensing device being connected to the second orders of said pairs whereby the zonal designation for each column and the second designation for such column are entered in a pair of orders; and machine control means selected by said comparing mechanism according to the sequence relationship one field bears to the other.

2. In a machine controlled by records in which alphabetic data is recorded in alphabetic fields composed of a plurality of columns of index-point positions, each column including a group of zonal index-point positions representing a series of sequence groups into which the alphabet is divided, one of said zonal index-point positions in each column containing a designation representing the sequence group of a character recorded in said column, each column also including a series of numerical index-point positions representing the sequence of the characters in any of the sequence groups and containing a second designation denoting the position of a character decorded in such column in the sequence group identified by the zonal designation in said column; record comparing mechanism comprising two opposed sections, one section for each field, each section being composed of a series of pairs of comparing magnets, one magnet of each pair for entering in the comparing means the zonal designations for one column and the other magnet for entering the numerical designation for the same column; main sensing means for traversing the columns of said fields including two series of main sensing brushes, one series for each section, one brush for each column, and connected to the magnets for entering the numerical designations in said sections; auxiliary sensing means spaced from the main sensing device in the direction of traverse of said columns including two series of auxiliary sensing brushes, each series corresponding to a series of main brushes and being connected to the magnets for entering the zonal designations in the section of the comparing mechanism to which the corresponding series of main brushes are connected whereby the zonal designation and the related numerical designation for each column will be entered in two orders of the comparing mechanism by means of a pair of comparing magnets; and a machine control magnet selected by said comparing mechanism when a predetermined sequence relation exists between two compared fields.

3. In a machine controlled by records in which alphabetic data is recorded in alphabetic fields composed of a plurality of columns of index-point positions, each column including a group of zonal index-point positions representing a series of sequence groups into which the alphabet is divided, one of said zonal index-point positions in each column containing a designation representing the sequence group of a character recorded in said column, each column also including a series of numerical index-point positions representing the sequence of the characters in any of the sequence groups and containing a second designation denoting the position of a character recorded in such column in the sequence group identified by the zonal designation in said column; record comparing mechanism comprising two opposed sections, one section for each field, each section being composed of a series of pairs of comparing magnets, one magnet of each pair for entering in the comparing means the zonal designations for one column and the other magnet for entering the numerical designation for the same column; main sensing means for said fields including two rows of main sensing brushes, one row for each section, and connected to the magnets for entering the numerical designations in said sections; auxiliary sensing means including two separate rows of auxiliary sensing brushes, each row corresponding to and parallel with a row of main brushes and being connected to the magnets for entering the zonal designations in the section of the comparing mechanism to which the corresponding row of main brushes are connected whereby the zonal designation and the related numerical designation for each column will be entered in two orders of the comparing mechanism by means of a pair of comparing magnets; each row of main brushes and the corresponding row of auxiliary brushes being spaced so that the zonal index-point positions for each column are sensed simultaneously with the numerical index-point positions; and a machine control magnet selected by said comparing mechanism when a predetermined sequence relation exists between two compared fields.

4. A record distributing machine controlled by records having alphabetic data recorded therein by means of combinations of designations disposed in the columns of alphabetic fields on said records, said columns being divided into at least two groups of index point positions, each designation of a combination being placed in one of the positions of one group, each character being represented by a designation in one group and a designation in another group of a single column; record comparing mechanism including a plurality of opposed comparing sections, each section including a series of entry controlling magnets, said comparing mechanism including switching mechanism controlled by all of said magnets and capable of closing circuits denoting equality of alphabetic sequence between any of the compared fields and also which of the fields is lowest in alphabetic sequence when the fields are unequal; means to feed records to be compared in a plurality of alphabetic fields; means for successively sensing the index-point positions in said groups of index-point positions including a plurality of rows of electrical sensing elements for each field to be compared, each row for traversing predetermined groups of index-point positions in such field and having connections at regular intervals to the orders of one of said comparing sections whereby the designations in the groups of each column of a field are entered in successive orders of the section associated with said field; and a series of magnets representing different sequence relations in said fields selected by said switching mechanism.

5. A record distributing machine controlled by records having alphabetic data recorded by means of combinations of designations disposed in the columns of an alphabetic field, each character being represented by a combination of two designations differentially disposed in two separate portions of a single column, record comparing mechanism having two sections, each section having twice as many comparing orders as the number of columns in the alphabetic field, means to feed two separate records, each having an alphabetic field to be compared with the field on the other record for alphabetic sequence; means for sensing said fields comprising a pair of main sensing devices for sensing the position of the designations in two corresponding portions of said record columns, each main sensing device having connections to alternate orders of one section of the comparing means, said sensing means also including a pair of auxiliary sensing devices, one for each main sensing device, each auxiliary sensing device having connections to the remaining orders of the same section of the comparing mechanism as the corresponding main sensing device, each main sensing device and its auxiliary sensing device being spaced apart in the direction of feed of the records to enable the auxiliary sensing devices to sense the second portions of the record columns while the main sensing devices are sensing the first portions to thereby enter each pair of designations in a record column in two successive orders of a comparing section; and record distributing mechanism for controlling the distribution of the compared records in accordance with the comparison effected by the comparing mechanism.

6. A record distributing machine controlled by records having alphabetic data recorded by means of combinations of designations disposed in the columns of an alphabetic field, each character being represented by a combination of two designations differentially disposed in two separate portions of a single column, record comparing mechanism having two sections, each section having twice as many comparing orders as the number of columns in the alphabetic field, means to feed two separate records, each having an alphabetic field to be compared with the field on the other record for alphabetic sequence; means for sensing said fields comprising a pair of main sensing devices for sensing the position of the designations in two corresponding portions of said record columns, each main sensing device having connections to alternate orders of one section of the comparing means, said sensing means also including a pair of auxiliary sensing devices, one for each main sensing device, each auxiliary sensing device having connections to the remaining orders of the same section of the comparing mechanism as the corresponding main sensing device, each main sensing device and its auxiliary sensing device being spaced apart in the direction of feed of the records to enable the auxiliary sensing devices to sense the second portions of the record columns while the main sensing devices are sensing the first portions to thereby enter each pair of designations in a record column in two successive orders of a comparing section; and means for controlling the feeding mechanism in accordance with the comparison made by the comparing mechanism.

7. A record distributing machine controlled by records having alphabetic data recorded by means of combinations of designations disposed in the columns of an alphabetic field, each character being represented by a combination of two designations differentially disposed in two separate portions of a single column, record comparing mechanism having two sections, each section having twice as many comparing orders as the number of columns in the alphabetic field, means to feed two separate records, each having an alphabetic field to be compared with the field on the other record for alphabetic sequence; means for sensing said fields comprising a pair of main sensing devices for sensing the position of the designations in two corresponding portions of said record columns, each main sensing device having connections to alternate orders of one section of the comparing means, said sensing means also including a pair of auxiliary sensing devices, one for each main sensing device and separated therefrom, each auxiliary sensing device having connections to the remaining orders of the same section of the comparing mechanism as the corresponding main sensing device, each main sensing device and its auxiliary sensing device being spaced apart in the direction of feed of the records to enable the auxiliary sensing devices to sense the second portions of the record columns while the main sensing devices are sensing the first portions to thereby enter each pair of designations in a record column in two successive orders of a comparing section; and means controlled by the comparing means for merging said records in an alphabetical sequence.

8. A record distributing machine controlled by records having alphabetic data recorded by means of combinations of designations disposed in the columns of an alphabetic field, each character being represented by a combination of two designations differentially disposed in two separate portions of a single column, record comparing mechanism having two sections, each section having twice as many comparing orders as the number of columns in the alphabetic field, means to feed two separate records, each having an alphabetic field to be compared with the field on the other record for alphabetic sequence; means for sensing said fields comprising a pair of main sensing devices for sensing the position of the designations in two corresponding portions of said record columns, each main sensing device having connections to alternate orders of one section of the comparing means, said sensing means also including a pair of separate auxiliary sensing devices, one for each main sensing device, each auxiliary sensing device having connections to the remaining orders of the same section of the comparing mechanism as the corresponding main sensing device, each main sensing device and its auxiliary sensing device being spaced apart in the direction of feed of the records to enable the auxiliary sensing devices to sense the second portions of the record columns while the main sensing devices are sensing the first portions to thereby enter each pair of designations in a record column in two successive orders of a comparing section; and machine control means selected by said comparing means according to which of the compared fields is lowest in alphabetic sequence.

9. A record distributing machine controlled by records having alphabetic data recorded by means of combinations of designations disposed in the columns of an alphabetic field, each character being represented by a combination of two designations differentially disposed in two separate portions of a single column, record comparing mechanism having two sections, one for each alphabetic field, each section having a series of magnets for entering the designations of one of said fields in the comparing mechanism and a switching mechanism for denoting whether said fields are equal or one higher than the other; means to feed two records, each having an alphabetic field which is to be compared with the other for alphabetic sequence; means for sensing said fields including two rows of electrical sensing elements, each row for sensing one of the two separate portions of said columns and having connections to alternate magnets of one of said comparing sections, said sensing means also including two rows of auxiliary electrical sensing elements, one row for each main row and connected to the remaining orders of the comparing section associated with such row, each row of auxiliary sensing elements being spaced from the associated main row of sensing elements so as to sense the second of the two separate portions of said columns while the main row is sensing the first portions whereby each pair of designations in any column will be entered in a pair of comparing orders by controlling the pair of magnets for such order; and record distributing mechanism for controlling the distribution of the compared records according to the comparison effected by said comparing mechanism including record distributing magnets selectable by said switching mechanism.

10. A record distributing machine controlled by records having alphabetic data recorded by means of combinations of designations disposed in the columns of an alphabetic field, each character being represented by a combination of two designations differentially disposed in two separate portions of a single column, record comparing mechanism having two sections, one for each alphabetic field, each section having a series of magnets for entering the designations of one of said fields in the comparing mechanism and a switching mechanism for denoting whether said fields are equal or one higher than the other; means to feed two records, each having an alphabetic field which is to be compared with the other for alphabetic sequence; means for sensing said fields including two rows of electrical sensing elements, each row for sensing one of the two separate portions of said columns and having connections to alternate magnets of one of said comparing sections, said sensing means also including two rows of auxiliary electrical sensing elements, one row for each main row and connected to the remaining orders of the comparing section associated with such row, each row of auxiliary sensing elements being spaced from the associated main row of sensing elements so as to sense the second of the two separate portions of said columns while the main row is sensing the first portion whereby each pair of designations in any column will be entered in a pair of comparing orders by controlling the pair of magnets for such order; and means for controlling the feeding of the compared records in accordance with the comparison made by the comparing means including magnets selected by said switching mechanism for rendering the feeding means effective.

11. A record distributing machine controlled by records having alphabetic data recorded by means of combinations of designations disposed in the columns of an alphabetic field, each character being represented by a combination of two designations differentially disposed in two separate portions of a single column, record comparing mechanism having two sections, one for each alphabetic field, each section having a series of magnets for entering the designations of one of said fields in the comparing mechanism and a switching mechanism for denoting whether said fields are equal or one higher than the other; means to feed two records, each having an alphabetic field which is to be compared with the other for alphabetic sequence; means for sensing said fields including two rows of electrical sensing elements, each row for sensing one of the two separate portions of said columns and having connections to alternate magnets of one of said comparing sections, said sensing means also including two rows of auxiliary electrical sensing elements, one row for each main row and connected to the remaining orders of the comparing section associated with such row, each row of auxiliary sensing elements being spaced from the associated main row of sensing elements so as to sense the second of the two separate portions of said columns while the main row is sensing the first portions whereby each pair of designations in any column will be entered in a pair of comparing orders by controlling the pair of magnets for such order; and means controlled by said switching means for merging said records in an alphabetic sequence.

12. A record distributing machine controlled by records having alphabetic data recorded by means of combinations of designations disposed in the columns of an alphabetic field, each character being represented by a combination of two designations differentially disposed in two separate portions of a single column, record comparing mechanism having two sections, one for each alphabetic field, each section having a series of magnets for entering the designations of one of said fields in the comparing mechanism and a switching mechanism for denoting whether said fields are equal or one higher than the other; means to feed two records, each having an alphabetic field which is to be compared with the other for alphabetic sequence; means for sensing said fields including two rows of electrical sensing elements, each row for sensing one of the two separate portions of said columns and having connections to alternate magnets of one of said comparing sections, said sensing means also including two rows of auxiliary electrical sensing elements, one row for each main row and connected to the remaining orders of the comparing section associated with such row, each row of auxiliary sensing elements being spaced from the associated main row of sensing elements so as to sense the second of the two separate portions of said columns while the main row is sensing the first portions whereby each pair of designations in any column will be entered in a pair of comparing orders by controlling the pair of magnets for such order; and a series of machine control magnets selected by said switching means according to which of the compared fields is lowest in alphabetic sequence.

JAMES. D. HOOD.

REFERENCES CITED

The following references are of record in the file of this patent:

UNITED STATES PATENTS

| Number | Name | Date |
|---|---|---|
| 2,434,512 | Page | Jan. 13, 1948 |